April 22, 1941.  E. FISCHER  2,238,893

SUBDIVIDED MAGNETIC CORE WITH POLYSTYRENE BINDER

Original Filed April 17, 1934

Inventor
Ernst Fischer
by Knight Bros
attorneys

Patented Apr. 22, 1941

2,238,893

UNITED STATES PATENT OFFICE 2,238,893

SUBDIVIDED MAGNETIC CORE WITH POLYSTYRENE BINDER

Ernst Fischer, Berlin-Lichterfelde, Germany, assignor to Siemens & Halske Aktiengesellschaft, Siemensstadt, near Berlin, Germany, a corporation of Germany Original application April 17, 1934, Serial No. 720,923. Divided and this application May 25, 1938, Serial No. 209,917. In Germany April 21, 1933

1 Claim. (Cl. 175—21)

My invention relates to magnet coils having a magnet core composed of individual ferromagnetic elements and an insulating binder, such as inductive loading and repeating coils and the like for communication cables.

This is a division of my application, Serial No. 720,923, filed April 17, 1934, and is also related to my co-pending application, Serial No. 209,918, filed May 25, 1938, also dealing with magnet coils of the above-mentioned type.

According to the present invention, the magnet cores of magnet coils, such as loading or repeating coils, which are composed of individual elements, such as sheet iron, ribbons, powder particles, and the like, are insulated from and firmly bound together by a solid binding agent consisting of thermoplastic and non-hygroscopic substance, polystyrene being used as such substance. By "non-hygroscopic" I mean a resistance to humidity at least as high as that of gutta-percha or other so-called "non-hygroscopic" substances customary for submarine cable insulation.

The drawing illustrates for example an enclosed loading coil according to my invention.

Figure 1:
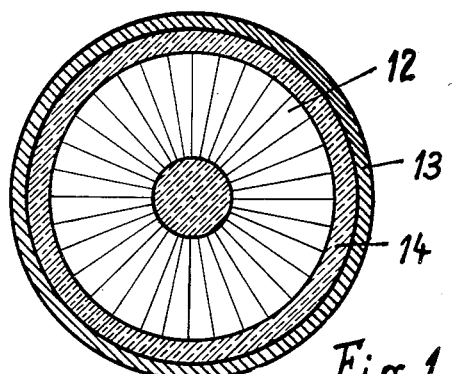
Fig. 1 shows the coil and its enclosure by a top view partly in section.

With reference to Fig. 1, numeral 12 denotes the loading coil enclosed in a metallic covering 13, and 14 an insulating compound consisting, for instance, of hydrogenated synthetic rubber.

Figure 2:
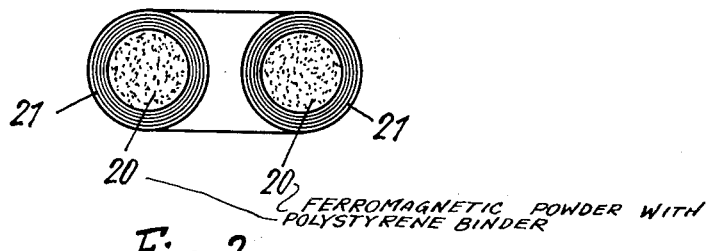
Fig. 2 shows the coil without enclosure in a sectional view taken at a right angle with respect to that of Fig. 1.

According to Fig. 2, the coil 12 is composed of an annular magnet core 20 and windings 21 surrounding the core. The core consists of individual elements, namely, pressed magnetizable powder particles which are insulated from one another by polystyrene. The wires of winding 21 may also be insulated by polystyrene or another non-hygroscopic substance.

Magnet coils according to the invention have a number of advantages over coils, the cores of which are composed in the known manner. Polystyrene, being used according to the invention as binding agent of the core particles, affords a considerable improvement of the dielectric and magnetic properties of the core in combination with excellent binding properties, and has also an exceptionally low hygroscopicity so that the enhanced dielectric and magnetic properties of the core are further distinguished by an increased stability. The magnet coils therefore maintain their qualities even if exposed to water. The coils or cores, therefore, may be stored in the factory for a considerable time without being deteriorated by humidity, and present advantages in all other cases in which an ingress of water to the coils cannot entirely be avoided.

Magnet coils according to the invention present additional advantages in the form of loading or repeating coils for communication cables, particularly submarine cables. In submarine cables such auxiliary elements are, as a rule, located in joint boxes with which the cables are provided in the factory and which are so designed that the flexibility of the submarine cable is only slightly impaired. Particular precautions must be taken especially in submarine cables in order to protect the auxiliary elements against the absorption of water, since such absorption would result in a deterioration of the transmitting properties of the cable and in the expensive replacement of the magnet coils. However, the penetration of water into the boxes cannot be completely avoided. In metallic joint boxes small quantities of water may penetrate into the box through leaky points of the enclosure, even if a rubber covering is arranged over the box. Water may also reach the coils and their magnet body by slowly penetrating through the cable insulation, and this may occur even in the case of gutta-percha insulated cables owing to the slight hygroscopicity of gutta-percha. It has been found that the compound contained inside the joint boxes is not alone sufficient to prevent the further penetration of water, since, as is well known, all compounds are not fully non-hygroscopic and besides, flaws, cracks and the like are frequently formed in the compound during the solidification when pouring the compound into the box and further in the course of time. If, however, the water has reached the magnet coils as a result of the flaws, these elements deteriorate in their magnetic and electric properties and eventually must be replaced, which causes an interruption of operation and considerable expense. However, if magnet coils according to the invention are employed, a magnetic and dielectric deterioration is prevented.

The polystyrene to be used according to the invention may contain admixtures in particular of non-hygroscopic thermoplastic agents.

According to my invention, polystyrene is employed not only for electrically insulating the ferromagnetic particles of the magnet core from one another, but preferably also for insulating the wires forming the windings of the coil. This use of polystyrene as insulating substance within the magnet core as well as for insulating the individual wires has especially favorable transmission qualities of extreme stability against magnetic and dielectric impairments. The danger of a deterioration of the magnet coil is further diminished by the fact that the casing which individually encloses the coil is provided with a liquid or viscous non-hygroscopic insulating compound which fills all hollow spaces between casing and coil. As filling compound, liquid or viscous hydrogenated synthetic rubber is particularly suitable for this purpose. If desired, other substances may be added thereto. Other filling compounds may also be employed, particularly such which subsequently become solid or are subsequently caused to solidify.

Besides the above-described advantages, a further advantage is attained in submarine cables according to my invention, in that various protective measures which have been hitherto necessary may be dispensed with; for instance the arrangement of an additional rubber covering over the joint box in the case of submarine cables with metallic sheath. Furthermore, a greater reliability of operation is obtained if the submarine cable is divided into short manufacturing lengths and the auxiliary elements are arranged therein at short intervals, which is in many cases of advantage from an electrical point of view. The attainment of the favorable electrical properties of submarine cables brought about by the loading coils has been hitherto frequently given up owing to the fact that the number of the faulty sources is the greater, the shorter the distance at which the auxiliary coils were arranged. The invention now enables a full utilization of the advantage of inserting the coils without diminishing the reliability.

I claim:

A non-hygroscopic magnet core for inductance coils for electric communication systems subject to high-humidity conditions, consisting of a pressed solid mixture of ferromagnetic powder and an insulating binder consisting of polystyrene and being non-hygroscopic to a degree customary in submarine cable insulation.

ERNST FISCHER.